Figure 1:
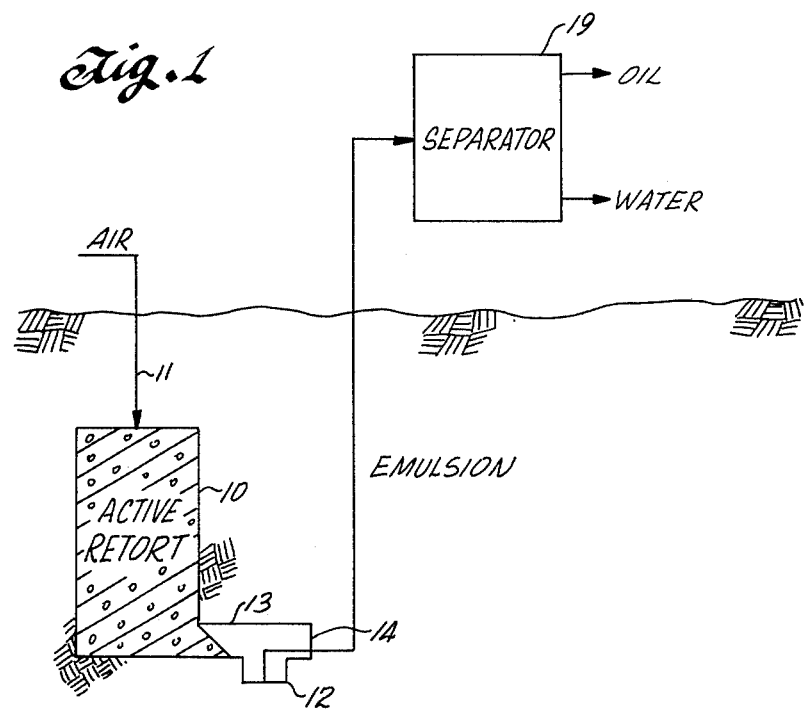

United States Patent [19]

Compton

[11] 4,174,751

[45] Nov. 20, 1979

[54] METHOD OF BREAKING SHALE OIL-WATER EMULSION

[75] Inventor: Leslie E. Compton, Claremont, Calif.

[73] Assignee: Occidental Oil Shale, Inc., Grand Junction, Colo.

[21] Appl. No.: 871,368

[22] Filed: Jan. 23, 1978

[51] Int. Cl.² ............ E21B 43/24; E21C 41/10; B01D 17/04
[52] U.S. Cl. .................. 166/256; 166/259; 166/267; 166/302; 208/187; 210/187; 299/2
[58] Field of Search ............ 166/256, 259, 265, 266, 166/267, 272, 302; 208/11 R, 187, 188; 210/187; 299/2

[56] References Cited

U.S. PATENT DOCUMENTS

| | | | |
|---|---|---|---|
| 1,448,593 | 3/1923 | Jaworski | 210/187 X |
| 1,675,775 | 7/1928 | Umbarger | 210/187 X |
| 2,481,051 | 9/1949 | Uren | 299/2 |
| 2,601,904 | 7/1952 | Erwin | 210/187 X |
| 2,725,939 | 12/1955 | Belser | 166/57 |
| 2,825,422 | 3/1958 | Schoenfeld | 210/187 X |
| 2,837,213 | 6/1958 | Murdock | 210/187 |
| 3,051,644 | 8/1962 | Friedman et al. | 208/11 R |
| 3,066,732 | 12/1962 | McEver | 166/266 |
| 3,112,255 | 11/1963 | Campion | 208/11 R |
| 3,267,998 | 8/1966 | Simpson | 166/272 X |
| 3,380,913 | 4/1968 | Henderson | 166/267 X |
| 3,892,276 | 7/1975 | Wells | 166/267 |
| 3,929,625 | 12/1975 | Lucas | 208/188 |
| 4,082,669 | 4/1978 | Bainbridge | 210/187 |
| 4,109,718 | 8/1978 | Burton | 166/256 |
| 4,121,662 | 10/1978 | Kilburn | 166/259 |

OTHER PUBLICATIONS

Uren, L. C., Petroleum Production Engineering—Oil Field Exploitation, Third Edition, 1953, pp. 573–575.

Primary Examiner—Stephen J. Novosad
Assistant Examiner—George A. Suchfield
Attorney, Agent, or Firm—Christie, Parker & Hale

[57] ABSTRACT

A technique is described for breaking the very strong emulsion of shale oil and water produced by an in situ oil shale retorting process so that separate shale oil and water phases can be recovered. The emulsion is broken by maintaining a volume of such emulsion at a bulk temperature of at least about 120° F., and momentarily heating portions of emulsion to a temperature substantially higher than the bulk temperature of the emulsion. Preferably the emulsion of shale oil and water is held at a bulk temperature in the range of from about 120° to 190° F. in contact with heating means maintained in the range of from about 170° F. to about 240° F. Momentary localized heating of emulsion to a temperature substantially higher than the bulk temperature of the emulsion accelerates the breaking of the emulsion.

23 Claims, 2 Drawing Figures

METHOD OF BREAKING SHALE OIL-WATER EMULSION

BACKGROUND

The presence of large deposits of oil shale in the Rocky Mountain region of the United States has given rise to extensive efforts to develop methods of recovering shale oil from kerogen in the oil shale deposits. It should be noted that the term "oil shale" as used in the industry is in fact a misnomer; it is neither shale nor does it contain oil. It is a sedimentary formation comprising marlstone deposit having layers containing an organic polymer called "kerogen", which upon heating decomposes to produce hydrocarbon liquid and gaseous products. It is the formation containing kerogen that is called "oil shale" herein, and the liquid hydrocarbon product is called "shale oil".

A number of methods have been proposed for processing oil shale which involve either first mining the kerogen bearing shale and processing the shale above ground, or processing the oil shale in situ. The latter approach is preferable from the standpoint of environmental impact since the spent shale remains in place, reducing the chance of surface contamination and the requirement for disposal of solid wastes.

The recovery of liquid and gaseous products from oil shale deposits has been described in several patents, one of which is U.S. Pat. No. 3,661,423, issued May 9, 1972 to Donald E. Garrett, assigned to the assignee of this application, and incorporated herein by this reference. This patent describes in situ recovery of liquid and gaseous hydrocarbon materials from a subterranean formation containing oil shale by mining out a portion of the subterranean formation and then fragmenting a portion of the remaining formation to form a stationary, fragmented permeable mass of formation particles containing oil shale, referred to herein as an in situ oil shale retort. Hot retorting gases are passed through the in situ oil shale retort for advancing a retorting zone through the fragmented mass. Kerogen in oil shale in the retorting zone is decomposed to liquid and gaseous products.

One method of supplying hot retorting gases used for converting kerogen contained in the oil shale, as described in U.S. Pat. No. 3,661,423, includes establishment of a combustion zone in the retort and introduction of an oxygen containing retort inlet mixture into the retort as a gaseous combustion zone feed to advance the combustion zone through the retort. In the combustion zone oxygen in the combustion zone feed is depleted by reaction with hot carbonaceous materials to produce heat and combustion gas. By the continued introduction of the gaseous combustion zone feed into the combustion zone, the combustion zone is advanced through the retort.

Gas from the combustion zone passes through the fragmented mass in the retort on the advancing side of the combustion zone to heat oil shale in a retorting zone to a temperature sufficient to produce kerogen decomposition, called retorting, in the oil shale to gaseous and liquid products and to a residue of solid carbonaceous material.

As used herein, the term "processing gas" is used to indicate gas which serves to advance a processing zone such as a combustion zone, a retorting zone, or both a retorting zone and combustion zone, through the fragmented mass in an in situ oil shale retort, and includes, but is not limited to, an oxygen supplying gas introduced into a retort for advancing a combustion zone and retorting zone through a retort and a hot retorting gas which can be introduced into a retort or generated in a combustion zone in a retort for advancing a retorting zone through a retort.

The liquid products and gaseous products are cooled by cooler particles in the fragmented mass in the retort on the advancing side of the retorting zone. The liquid hydrocarbon products, together with water produced in or added to the retort, are collected at the bottom of the retort and withdrawn to the surface through an access tunnel, drift or shaft. A portion of the liquid products collected at the bottom of the retort can result from condensation of hydrocarbon vapors from the retorting zone on the cooler particles in the fragmented mass on the advancing side of the retorting zone. Water vapor from water produced in or added to the retort can also condense on such cooler particles. An effluent gas, referred to herein as off gas, containing combustion gas generated in the combustion zone, gaseous products including methane produced in the retorting zone, carbon dioxide from carbonate decomposition, and any gaseous portion of the combustion zone feed that does not take part in the combustion process is also withdrawn from the bottom of the retort.

The products recovered from the bottom of the retort include off gas, liquid shale oil, and water. Some separate shale oil and water phases can be recovered at the bottom of the retort but much of the product is in the form of a viscous emulsion of water and shale oil. The troublesome existence of stable shale oil-water emulsions has been recognized; see, for example, U.S. Pat. No. 3,929,625 to Lucas, which describes a process employing chemical surface active agents and water for removing suspended solids from shale oil.

Before such emulsion is broken, it can be a thixotropic fluid that flows so long as pumping is continued. When pumping is stopped such fluid tends to set up much like a gel and it is difficult to get moving again. The emulsion can be predominantly in the form of an oil-in-water-in-oil emulsion in which a continuous shale oil phase contains dispersed water droplets which in turn contain dispersed shale oil droplets. Such emulsion has proven to be highly resistant to petroleum de-emulsifying additives. This emulsion forms in the retort under conditions that are not fully understood and may very well involve condensation of water vapor, or co-condensation of water vapor and hydrocarbon vapors, on cooler particles in the fragmented mass on the advancing side of the retorting zone. It is known that the emulsion from the bottom of the in situ oil shale retort is particularly difficult to break by known techniques. A variety of chemical treatments of emulsion have been attempted to cause a separation of the shale oil and water into separable phases and no fully satisfactory economical technique has been discovered.

The large amount of water in emulsion with the shale oil significantly affects its properties, including its viscosity. The emulsion is sluggish and difficult to handle and can involve a substantial storage and shipment problem since there may be up to 75% water in the emulsion. It is also desirable to separate water from the shale oil for use of the water at the site of retorting. It is therefore desirable to provide a technique for economically breaking the shale oil-water emulsion from an in situ oil shale retort.

Petroleum-water emulsions are sometimes encountered in producing petroleum from wells. Emulsion breaking chemicals can be used for separating such an emulsion. A heater-treater can be used either alone or in combination with chemicals. A heater-treater is essentially a large vessel wherein an emulsion is heated by immersed heater tubes and thereafter travels over trays or through a filtering medium to separate petroleum and water. Average residence time of petroleum in a heater-treater is in the order of two to ten hours, although four to five hours seems to be most typical.

A heater-treater is shown in the *Petroleum Production Handbook*, edited by Thomas C. Frick and published by Society of Petroleum Engineers of A.I.M.E., Dallas, Texas (1962), along with related information at pages 6-27 to 6-35. Although this discussion concerns preparation of power oil for use in downhole hydraulic pumps for pumping oil wells, the description of the heater-treater is not unique to this application of the equipment. Details of the internal construction of emulsion heater-treaters employed in the petroleum industry are shown in U.S. Pat. Nos. 2,832,431, and 3,029,580.

Heater-treaters are also described in *Petroleum Production Engineering* by Lester Charles Uren, published by McGraw-Hill Book Company, Inc., New York (1962), at pages 572-575. In one such heater-treater, emulsion of petroleum and water is introduced into a layer of water maintained at 150° to 200° F. with immersed steam coils. Emulsion is heated by contact with the hot water and breaks down. Direct contact between the coils and the petroleum is avoided to prevent formation of a solid hydrocarbon coating on the coils. In another form of heater-treater, emulsion flows over heater tubes, where most water drops out, and into a quiet section where heated petroleum and emulsion are stored for a time while further separation of water and petroleum occurs.

Efforts have been made to separate the shale oil-water emulsion from in situ oil shale retorting using a conventional petroleum heater-treater. Heating has been in the range of from about 150° to 170° F. with various chemical additives and electrostatic fields employed for enhancing separation. Although some success has been obtained, the technique is not completely satisfactory and the equipment costs are high for a selected production rate.

U.S. patent application Ser. No. 737,556, filed Nov. 1, 1976, now U.S. Pat. No. 4,109,718, assigned to the assignee of the present application, and incorporated herein by this reference, describes breaking an emulsion of shale oil and water by holding the shale oil and water at a temperature above about 120° F. for at least about one day. Such a process is effective but time-consuming. For high production rates, appreciable elevated temperature storage capacity can be involved. Better techniques are desirable.

BRIEF SUMMARY OF THE INVENTION

There is provided in practice of this invention a simple process for breaking the emulsion of shale oil and water from an in situ oil shale retort by holding the emulsion of shale oil and water at a bulk temperature of at least about 120° F., momentarily heating portions of the emulsion to a temperature substantially higher than the bulk temperature, preferably at least about 50° F. higher than the bulk temperature of the emulsion, and cooling such heated portions. Said momentary heating and cooling of such portions of emulsion is continued for a sufficient time for separating shale oil and water from such emulsion. Good separations are obtained by maintaining a volume of such emulsion of shale oil and water at a bulk temperature in the range of from about 120° F. to 190° F. in contact with heating means maintained at a temperature at least about 50° F. higher than the bulk temperature, for example, a temperature in the range of from about 170° F. to about 240° F. until shale oil and water are separated from the emulsion. The heating means provides momentary, localized heating of minor portions of emulsion within the volume of emulsion.

DRAWINGS

Figure 2:
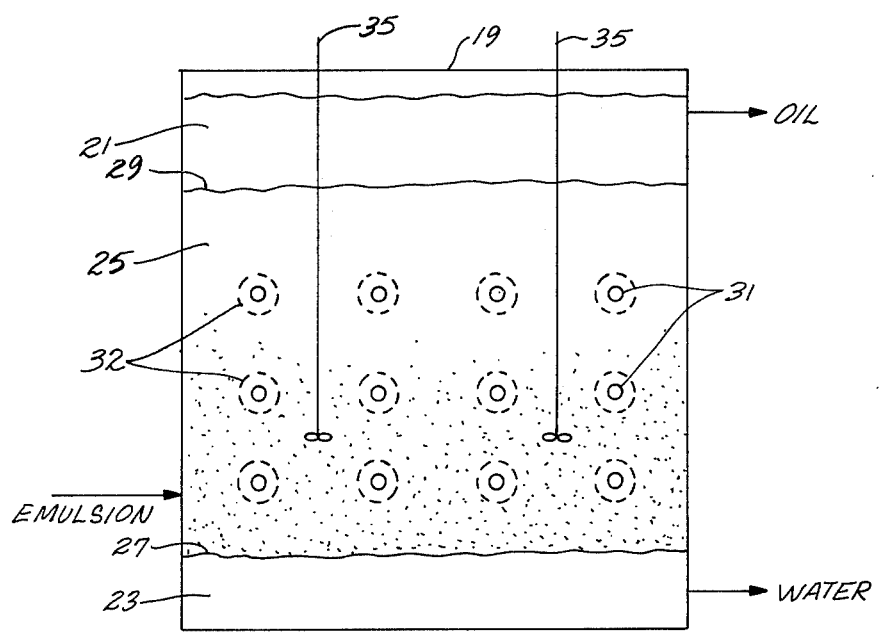

These and other features and advantages of the present invention will be appreciated as the same becomes better understood by reference to the following detailed description of a presently preferred embodiment when considered in connection with the accompanying drawings in which:

FIG. 1 illustrates in schematic form a process for separately recovering shale oil and water from an underground in situ oil shale retort; and FIG. 2 illustrates in schematic cross section an emulsion breaking heater-separator for use in practice of this invention.

DESCRIPTION

FIG. 1 is a semi-schematic vertical cross section drawn without regard to scale since relative dimensions of the retort and the separator are not of significance in practice of this invention. As illustrated in this embodiment there is an active in situ oil shale retort 10 containing a fragmented permeable mass of formation particles containing oil shale bounded by unfragmented formation containing oil shale.

The fragmented permeable mass of particles containing oil shale is formed by excavating at least one void within the boundaries of the retort being formed and explosively expanding a portion of the formation toward such a void. Several techniques have been described for forming an in situ oil shale retort.

After the fragmented permeable mass is formed a combustion zone is established in the fragmented mass by igniting carbonaceous material in the oil shale. Air or other oxygen containing gas is introduced through a conduit 11 to the fragmented permeable mass in the retort 10. The oxygen containing gas introduced into the combustion zone causes the combustion zone to advance through the fragmented permeable mass. Heated gas from the combustion zone passing through the retort establishes a retorting zone on the advancing side of the combustion zone. Particles containing oil shale are heated within the retorting zone and kerogen in the oil shale is decomposed to form gaseous and liquid products including shale oil. Shale oil percolates through the fragmented permeable mass and flows from the in situ oil shale retort into a sump 12 in a laterally extending drift 13. Off gas from the in situ oil shale retort is also withdrawn through the access drift 13 through a gas tight bulkhead 14.

Water vapor is present in the retorting zone in an active in situ oil shale retort. There are several potential sources for such water including connate water in the subterranean formation, water leaking into the in situ oil shale retort from underground aquifers, water introduced with the oxygen containing gas for retorting, and combustion products from the combustion zone.

Raw or unretorted oil shale on the advancing side of the retorting zone can be at a temperature below the dew point of the gas in the retorting zone. This leads to condensation of water. The unretorted oil shale can also include shale oil on its surfaces percolating downwardly from the retorting zone. Some components of the shale oil may be vaporized in the retorting zone and also be condensing on unretorted oil shale. The exact mechanisms occurring in the retort on the advancing side of the retorting zone are not known. It is known, however, that a shale oil-water emulsion is recovered from the sump 12 on the advancing side of the retorting zone. In some cases reasonably dry shale oil and/or reasonably clean water can be obtained from the sump. Substantial amounts of shale oil-water emulsion can also occur.

The emulsion of shale oil and water from an in situ oil shale retort turns out to be particularly difficult to break as compared with ordinary emulsions of petroleum and water. It is believed that this can be a result of the mode of formation of the emulsion by condensation on oil shale on the advancing side of the retorting zone in an in situ oil shale retort. It is also possible that the products of retorting are sufficiently different in chemistry or structure to form more stable emulsions than are usually encountered in petroleum production. The aforementioned Lucas patent suggests that the chemical nature of shale oil contributes to forming stable emulsions.

The tight, or difficult to break, emulsion of water and shale oil is withdrawn from the sump 12 to a heater-separator 19. FIG. 2 schematically illustrates a form of heater-separator for use in practice of this invention.

Heater-separator 19 includes heating means shown in cross section as steam tubes 31 (extending perpendicular to the plane of the page), disposed within a layer 25 of emulsion in the heater-separator, between a shale oil-emulsion interface 29 and a water-emulsion interface 27. The interfaces can be somewhat diffuse, rather than sharp, and mark the transition between a separated layer and the layer of unseparated emulsion. A layer 21 of separated oil is at the top, and a layer 23 of separated water is at the bottom. The heater-separator can also include circulating means 35 for forcibly circulating emulsion within the layer 25 of emulsion past the heating means without causing substantial mixing of emulsion with the layer 21 of separated shale oil or the layer 23 of separated water. Forced circulation reduces the contact time of emulsion with the heating means and thus reduces the risk of decomposing shale oil in the emulsion, or of causing other undesirable changes, such as an increase in the pour point of the oil, or an accumulation of carbonized residue on the heaters.

Forced circulation of emulsion past the heaters increases the proportion of emulsion that is subjected to momentary heating and cooling in accordance with this invention, and thus can accelerate the breaking of the emulsion.

In accordance with practice of this invention; emulsion in the central layer 25 is maintained at a bulk temperature of at least 120° F., preferably in the range of from about 120° F. to about 190° F. The bulk temperature is the temperature of the major portion of emulsion in the layer 25 of emulsion that is not in close proximity to a heat exchange surface, such as a steam tube 31. The heating means, such as steam tubes 31, in contact with the emulsion is maintained at a temperature substantially higher than the bulk temperature of the emulsion layer, preferably in a range of from about 170° F. to 240° F. Thus, portions of emulsion close to the steam tubes 31 experience a temperature gradient in localized zones 32 indicated by dashed lines around the steam tubes 31, and are momentarily heated to temperatures closely approaching that of the steam tubes.

The temperature of the heating means can be above the boiling point of water in the emulsion, for example, 220° F. or higher. Evolution of steam at the heating means and condensation of the steam creates a localized turbulence that can help to break a shale oil and water emulsion. As the term is used herein, a "temperature substantially higher than the bulk temperature" is a temperature sufficiently higher than the bulk temperature to accelerate the breaking of the shale oil-water emulsion.

Heated emulsion in such a localized zone 32 moves away from the steam tube 31 by natural convection, aided by forced circulation if provided, and is rapidly cooled to the bulk temperature of the emulsion layer. Additional emulsion enters the localized zone around such a steam tube and is rapidly heated to temperatures approaching the temperature of the steam tube. As emulsion in the layer 25 of emulsion circulates past the steam tubes, minor portions of the emulsion are rapidly heated and cooled as they pass closer to and farther from the steam tubes. The rate of convection of emulsion past the heating means can determine the duration of the momentary heating of emulsion. Forced circulation shortens the duration of momentary heating by increasing the rate of circulation of emulsion past the heating means. The duration of momentary heating of portions of emulsion is preferably no greater than the duration provided by thermal convection. The duration of momentary heating of portions of emulsion is preferably decreased by effective circulation of emulsion past the heating means. Such momentary heating and cooling of portions of emulsion is continued repeatedly for a sufficient time for separating shale oil and water from such an emulsion.

It has been found that thus repeatedly subjecting portions of an emulsion of shale oil and water to momentary, localized heating at temperatures substantially above the bulk temperature of the emulsion while maintaining the bulk of the emulsion at a temperature above about 120° F. accelerates the breaking of the emulsion; that is, the emulsion breaks substantially faster than it would if held at the same bulk temperature but without momentary, localized heating of portions of the emulsion.

For simplicity, it is preferred to provide heating means in contact with the emulsion layer 25 in a heater-separator 19 as shown schematically in FIG. 2. However, if desired, portions of emulsion can be continuously withdrawn from the emulsion layer of a separator and heated in an external heater, e.g., a heat exchanger or a microwave heater, to a temperature substantially above the bulk temperature of the emulsion layer. Such heated portions of emulsion can then be introduced back into the emulsion layer.

The heating means can also be electrical heater elements or tubes or conduits containing a heat exchange liquid or gas. The heating means can also take the form of fins, rods, fingers, plates, or a jacket on the inside wall of the heater-separator adjacent to the emulsion layer. Direct injection of steam can also be employed. Other variations will be apparent. The particular means used for heating the emulsion is not critical in practice of this invention so long as portions of the emulsion are subjected to momentary, localized heating to a temperature substantially higher than the bulk temperature of the emulsion being broken, and the bulk temperature is at least about 120° F.

A wide variety of gravity settlers or decanters can be used in practice of this invention so long as means are provided for momentary heating of minor portions of emulsion, such as heating tubes disposed in the central layer of emulsion in such a settler. Conventional gravity settlers that can be adopted for such use as described in *Perry's Chemical Engineer's Handbook,* 4th Edition, (McGraw-Hill Book Company New York, 1963), pages 21-17 to 21-20, the disclosure of which is incorporated herein by this reference.

Heat treatment of emulsion of shale oil and water in accordance with this invention is continued for a sufficient time for separating shale oil and water from such emulsion. The time can vary widely depending on the temperatures used, volume of emulsion being treated, the kind of chemical additive used if any, and the particular retort from which the emulsion is obtained. The time can be in the range of from about 1 to 24 hours, for example, 4 to 12 hours.

In an embodiment of the present invention, sufficient heat is supplied for maintaining the bulk temperature of a volume of an emulsion of shale oil and water being broken above about 120° F. by contacting such emulsion with heating means maintained at a temperature at least 50° F. higher than the bulk temperature of the emulsion for a time sufficient for separating shale oil and water from the emulsion. The heating means has a surface area sufficient to maintain the bulk temperature within a desired range, e.g., about 120° F. to 190° F., taking into account the volume of emulsion being heated, the temperature of the heating means and the heat loss experienced.

Heating means used to accelerate the breaking of a shale oil and water emulsion in accordance with practice of this invention can be, but need be, the sole heating source employed for maintaining the bulk temperature of the emulsion.

Thus, for example, in another embodiment, the bulk temperature of the emulsion is only partly maintained by contacting emulsion with heating means held at a temperature substantially higher than the bulk temperature, and additional heat for maintaining the bulk temperature is supplied from another heat source having a temperature higher than but closer to the bulk temperature. Likewise, when the heating means includes a tube or conduit containing a heat exchange fluid initially at a temperature higher, e.g., about 50° F. higher, than the bulk temperature, the temperature of each tube or conduit can be less than about 50° F. higher than the bulk temperature at the downstream end thereof.

If desired, the emulsion being broken can be cooled at a location away from the heating means to maintain the bulk temperature within a desired range. Such cooling can be needed when the difference between the temperature of the heating means and the bulk temperature is very great, when the heat exchange surface area of the heating means is high, or when heat losses from the separator are low.

The emulsion breaking method of this invention can be practiced on a batch-wise basis or on a continuous basis. A volume of emulsion can be introduced into a settler and contacted with heating means therein until substantially all of the emulsion is broken. Alternatively, emulsion can be introduced into a settler at a sufficient rate for maintaining a volume of emulsion in contact with such heating means, and separated shale oil and water can be withdrawn at corresponding rates depending upon the relative proportion of shale oil and water in the introduced emulsion.

Chemical additives for breaking petroleum-water emulsions are not generally effective for breaking shale oil-water emulsions. However, certain de-emulsifying chemicals can be used advantageously in combination with practice of this invention, such as TRET-O-LITE DS-415, which is a de-emulsifier for petroleum-water emulsions produced by the TRETOLITE Division of Petrolite Corporation. De-emulsifying agents can be employed in concentrations ranging from about 10 to about 1000 parts per million parts of emulsion. In addition, shale oil-water emulsion can be heat treated in accordance with this invention and passed through a centrifuge or a coalescing filter for hastening the separation of the shale oil and the water.

EXAMPLE

Samples of shale oil-water emulsion from a composite sample from an in situ oil shale retort was placed in 15 or 20 cubic centimeter stoppered test tubes. The composite sample was 41.5 percent water by volume. Each sample tube was immersed in a water bath maintained at the desired temperature. The sample in the tube was thus heated to the desired temperature without experiencing a high temperature gradient, and was maintained at the desired temperature without experiencing any significant temperature gradient.

Other samples of shale oil-water emulsion from the same composite sample were heated to a desired bulk temperature and portions of the heated samples were momentarily heated to temperatures substantially higher than the bulk temperature in accordance with practice of this invention. This was accomplished by placing 150 milliliters of emulsion in a 250 milliliter beaker on a hot plate. Portions of emulsion near the bottom of the beakers were thus subjected to thermal shock, and convection currents continuously circulated portions of emulsion into contact with the hot bottom of the beaker. The bulk temperature was measured with a thermometer immersed half way into the sample at the center of the beaker. The results of these two experiments are presented in Table 1.

A comparison of the results in Table 1 shows clearly that treatment of shale oil-water emulsion in accordance with practice of this invention (Hot Plate Heating) provides faster and more complete breaking of the emulsion.

TABLE I

| Water Bath Heating | | | | Hot Plate Heating | | | | |
|---|---|---|---|---|---|---|---|---|
| Temp. (T), °F. | Time at T, hrs | Add., PPMV[1] | Percent Separated[2] | Temp. (T), °F. | Time to heat to T, hrs | Time at T, hrs | Add., PPMV[1] | Percent Separated[2] |
| 124 | 170 | 0 | 11 | 120 | 6 hours total | | 0 | 11 |
| 124 | 170 | 100 | 53 | 120 | 0.5 | 1.75 | 100 | 68 |
| 158 | 30 | 0 | 10 | 160 | 6 hours total | | 0 | 56 |
| 158 | 30 | 150 | 67 | 160 | 0.5 | 1.75 | 100 | 27 |

TABLE I-continued

| Water Bath Heating | | | | Hot Plate Heating | | | | |
|---|---|---|---|---|---|---|---|---|
| Temp. (T), °F. | Time at T, hrs | Add., PPMV[1] | Percent Separated[2] | Temp. (T), °F. | Time to heat to T, hrs | Time at T, hrs | Add., PPMV[1] | Percent Separated[2] |
| 176 | 12 | 0 | 46 | 160 | 0.5 | 1.75 | 100 | 89 |
| 176 | 12 | 90 | 77 | 175 | — | — | — | — |

[1] Volume percent of the total water in the sample (41.5%) separated as a water phase.
[2] TRET-O-LITE 1562, in parts per million by volume (PPMV)

What is claimed is:

1. A method for processing shale oil produced in an in situ oil shale retort in a subterranean formation containing oil shale comprising the steps of:

advancing a combustion zone through a fragmented mass of formation particles containing oil shale in such an in situ oil shale retort by introducing an oxygen containing gas to the fragmented mass on the trailing side of the combustion zone and withdrawing an off gas from the fragmented mass on the advancing side of the combustion zone, whereby gas flowing through the combustion zone transfers heat of combustion to a retorting zone in the fragmented mass on the advancing side of the combustion zone and kerogen in oil shale in the retorting zone is decomposed to produce gaseous and liquid products, said products percolating through at least a portion of the fragmented mass;

withdrawing liquid product including emulsion of shale oil and water from such an in situ oil shale retort;

maintaining a volume of such an emulsion of shale oil and water at a bulk temperature of at least about 120° F., heating portions of such emulsion momentarily to a temperature substantially higher than the bulk temperature of the volume of emulsion and mixing such heated portions of emulsion into the volume of emulsion, whereby such heated portions are cooled to the bulk temperature, said heating and mixing being continued for a sufficient time for separating shale oil and water from such emulsion; and recovering such separated shale oil.

2. A process as recited in claim 1 wherein the emulsion of shale oil and water is at a bulk temperature in the range of from about 120° to 190° F.

3. A process as recited in claim 2 wherein said portions of emulsion are momentarily heated to temperature in the range of from about 170° to 240° F.

4. A process as recited in claim 1 which comprises the step of circulating emulsion past heating elements immersed in the volume of emulsion for momentarily heating portions of emulsion and mixing such heated portions into the volume of emulsion.

5. A method for processing shale oil produced in an in situ oil shale retort in a subterranean formation containing oil shale comprising the steps of:

advancing a retorting zone through a fragmented permeable mass of formation particles containing oil shale in such an in situ oil shale retort by introducing a processing gas to the fragmented mass on the trailing side of the retorting zone and withdrawing an off gas from the fragmented mass on the advancing side of the combustion zone, whereby kerogen in oil shale in the retorting zone is decomposed to produce gaseous and liquid products, said liquid products percolating through at least a portion of the fragmented mass on the advancing side of the retorting zone, at least a portion of said products being in a vapor state in the retorting zone and condensing to the liquid state in the fragmented mass on the advancing side of the retorting zone and becoming part of said liquid products;

withdrawing liquid products including an emulsion of shale oil and water from the retort;

maintaining a volume of such an emulsion of shale oil and water at a bulk temperature of at least about 120° F.;

heating portions of such emulsion momentarily to a temperature substantially higher than the bulk temperature of the volume of emulsion and mixing such heated portions of emulsion into the volume of emulsion, said heating and mixing being continued for a sufficient time to separate shale oil and water from the emulsion; and recovering such separated shale oil.

6. A method as recited in claim 5 wherein the emulsion of shale oil and water is held at a bulk temperature in the range from about 120° to 190° F.

7. A method as recited in claim 6 which comprises momentarily heating such portions of emulsion to a temperature in the range of about 170° to 240° F.

8. A method as recited in claim 5 comprising the step of forcibly circulating emulsion past heating elements immersed in the volume of emulsion for heating such portions of emulsion and mixing such heated portions of emulsion into the volume of emulsion.

9. A method for recovering shale oil from an in situ oil retort in a subterranean formation containing oil shale, said in situ shale retort containing a fragmented permeable mass of particles containing oil shale, comprising the steps of:

retorting oil shale in the fragmented permeable mass and producing an emulsion of shale oil and water;

withdrawing emulsion of shale oil and water from the retort; and providing sufficient heat to maintain a volume of such emulsion of shale oil and water at a bulk temperature of at least about 120° F. by contacting such emulsion with heating means immersed in the volume of emulsion and maintained at a temperature substantially higher than the bulk temperature of the emulsion for a sufficient time for separating shale oil and water from the emulsion.

10. A method as recited in claim 9 wherein the bulk temperature of such an emulsion of shale oil and water is maintained in the range of from about 120° to 190° F. and the heating means is maintained in the range of from about 170° to 240° F.

11. A method as recited in claim 9 which comprises forcibly circulating the emulsion past the heating means for reducing the contact time of emulsion with the heating means relative to the contact time provided by thermal convection.

12. A method for recovering shale oil from an in situ oil shale retort in a subterranean formation containing oil shale, said in situ oil shale retort containing a fragmented permeable mass of particles containing oil shale, comprising the steps of:

retorting oil shale in the fragmented permeable mass and producing an emulsion of shale oil and water;

withdrawing emulsion of shale oil and water from the retort;

maintaining a volume of such emulsion of shale oil and water at a bulk temperature in the range of from about 120° to 190° F.; and heating portions of such emulsion to a temperature substantially higher than the bulk temperature of the emulsion and mixing such heated portions of emulsion into the volume of emulsion, such heating and mixing being continued for a sufficient time for separating shale oil and water from the emulsion.

13. A method as recited in claim 12 wherein such portions of emulsion are momentarily heated to a temperature in the range of from about 170° to 240° F.

14. A process for recovering shale oil from an in situ oil shale retort in a subterranean formation containing oil shale, said in situ oil shale retort containing a fragmented permeable mass of particles containing oil shale, comprising the steps of:

advancing a retorting zone through the fragmented permeable mass for retorting oil shale and producing shale oil, wherein water vapor is present in the retorting zone and an emulsion of shale oil and water forms on the advancing side of the retorting zone;

withdrawing emulsion of shale oil and water from the in situ oil shale retort on the advancing side of the retorting zone; and maintaining a volume of such emulsion of shale oil and water at a bulk temperature of at least about 120° F. and momentarily heating localized portions of such emulsion within the volume of emulsion to a temperature substantially higher than the bulk temperature of the volume of emulsion and mixing such heated portions of emulsion into the volume of emulsion, said heating and mixing being continued for a sufficient time for separating shale oil and water from such emulsion.

15. A method as recited in claim 14 wherein the volume of emulsion of shale oil and water is held at a bulk temperature in the range of from about 120° to 190° F. and said portions of such emulsion are momentarily heated to a temperature in the range of from about 170° to 240° F.

16. A method as recited in claim 14 in which said portions of emulsion are momentarily heated by contact with a heat transfer surface maintained at a temperature at least about 50° F. higher than the bulk temperature of the emulsion.

17. A process for recovering shale oil from an in situ oil shale retort in a subterranean formation containing oil shale, said in situ oil shale retort containing a fragmented permeable mass of particles containing oil shale, comprising the steps of:

advancing a retorting zone through the fragmented permeable mass for retorting oil shale and producing shale oil, wherein water vapor is present in the retorting zone and an emulsion of shale oil and water forms on the advancing side of the retorting zone;

withdrawing emulsion of shale oil and water from the in situ oil shale retort on the advancing side of the retorting zone; and maintaining a volume of such emulsion of shale oil and water at a bulk temperature of at least about 120° F. and contacting portions of such emulsion with heating means immersed in the volume of emulsion, for a sufficient time for separating shale oil and water from such emulsion, said heating means being maintained at a temperature substantially higher than the bulk temperature of the volume of emulsion.

18. A method for recovering shale oil from an in situ oil shale retort in a subterranean formation containing oil shale, said in situ oil shale retort containing a fragmented permeable mass of particles containing oil shale, comprising the steps of:

retorting oil shale in the fragmented permeable mass and producing an emulsion of shale oil and water;

withdrawing emulsion of shale oil and water from the retort;

maintaining a volume of such emulsion of shale oil and water at a bulk temperature of at least about 120° F., and subjecting portions of such emulsion to momentary, localized heating to temperatures substantially above the bulk temperature of the volume of emulsion until shale oil and water are substantially separated.

19. A method as recited in claim 18 which comprises immersing a heat exchange surface in the volume of emulsion for subjecting such portions of such emulsion to momentary localized heating, the heat exchange surface being maintained at a temperature at least about 50° F. higher than the bulk temperature.

20. A method for processing shale oil produced in an in situ oil shale retort in a subterranean formation containing oil shale comprising the steps of:

advancing a retorting zone through a fragmented permeable mass of formation particles containing oil shale in such an in situ oil shale retort by introducing a processing gas to the fragmented mass on the trailing side of the retorting zone and withdrawing an off gas from the fragmented mass on the advancing side of the combustion zone, whereby kerogen in oil shale in the retorting zone is decomposed to produce gaseous and liquid products, said liquid products percolating through at least a portion of the fragmented mass on the advancing side of the retorting zone, at least a portion of said products being in a vapor state in the retorting zone and condensing to the liquid state in the fragmented mass on the advancing side of the retorting zone and becoming part of said liquid products;

withdrawing liquid products including an emulsion of shale oil and water from the retort;

maintaining a volume of such an emulsion of shale oil and water at a bulk temperature of at least about 120° F.;

heating portions of such emulsion momentarily to a temperature substantially higher than the bulk temperature of the volume of emulsion and cooling such heated portions of emulsion to the bulk temperature of the emulsion, said heating and cooling being continued for a sufficient time to separate shale oil and water from the emulsion; and recovering such separated shale oil.

21. A method as recited in claim 20 wherein the emulsion of shale oil and water is maintained at a bulk temperature in the range of from about 120° to 190° F.

22. A method as recited in claim 21 which comprises momentarily heating such portions of emulsion to a temperature in the range of from about 170° to 240° F.

23. A method as recited in claim 20 wherein the cooling step comprises mixing such heated portions of emulsion into the volume of emulsion.

* * * * *

UNITED STATES PATENT AND TRADEMARK OFFICE
CERTIFICATE OF CORRECTION

PATENT NO. : 4,174,751

DATED : November 20, 1979

INVENTOR(S) : Leslie E. Compton

It is certified that error appears in the above-identified patent and that said Letters Patent are hereby corrected as shown below:

Column 7, line 39, -- not -- should be inserted after "need" and before "be".

Column 10, line 44, -- oil -- should be inserted after "situ" and before "shale".

Signed and Sealed this

Eighteenth Day of March 1980

[SEAL]

Attest:

SIDNEY A. DIAMOND

Attesting Officer

Commissioner of Patents and Trademarks